United States Patent [19]

Schuur

[11] Patent Number: 5,107,456

[45] Date of Patent: Apr. 21, 1992

[54] INTERFACE DEVICE FOR INTERFACING A NETWORK STATION TO A PHYSICAL NETWORK MEDIUM

[75] Inventor: Cornelis C. M. Schuur, Eindhoven, Netherlands

[73] Assignee: U.S. Philips Corporation, New York, N.Y.

[21] Appl. No.: 252,245

[22] Filed: Sep. 30, 1988

[30] Foreign Application Priority Data

Oct. 8, 1987 [NL] Netherlands .................. 8702394

[51] Int. Cl.⁵ .................. G06F 13/18; G06F 13/00; G06F 15/16
[52] U.S. Cl. .................. 395/325; 364/232.8; 364/238.5; 364/239.9; 364/240.8; 364/241.2; 364/241.6; 364/242.94; 364/242.96; 364/927.8; 364/927.92; 364/927.96; 364/927.97; 364/929; 364/940; 364/940.61; 364/940.62; 364/940.81; 364/941; 364/DIG. 1; 364/DIG. 2; 340/825.06
[58] Field of Search ... 364/200 MS File, 900 MS File; 340/825.06

[56] References Cited

U.S. PATENT DOCUMENTS

| 4,075,691 | 2/1978 | Davis et al. | 364/200 |
| 4,430,702 | 2/1984 | Schiebe et al. | 364/200 |
| 4,456,956 | 6/1984 | El-Gohary et al. | 364/200 |
| 4,493,051 | 1/1985 | Brezzo et al. | 364/900 |
| 4,504,901 | 3/1985 | Calvignac et al. | 364/200 |
| 4,516,205 | 5/1985 | Eing et al. | 364/200 |
| 4,590,468 | 5/1986 | Stieglitz | 340/825 |
| 4,638,356 | 1/1987 | Frezza | 358/118 |
| 4,652,874 | 3/1987 | Loyer | 340/825 |
| 4,700,185 | 10/1987 | Balph et al. | 340/825 |

OTHER PUBLICATIONS

Communication from European Patent Office dated Jan. 25, 1989 in EP88202129.8 a corresponding application.

Primary Examiner—Thomas C. Lee
Assistant Examiner—Krisna Lim
Attorney, Agent, or Firm—Anne E. Barschall

[57] ABSTRACT

An interface for a connection network between individual stations and a physical medium used for the message traffic between these stations, where signals supplied via the physical medium are converted into a bit stream by means of a demodulator, such a bit stream being converted into signals to be transmitted via the physical medium by means of a modulator, a protocol control unit is connected thereto and communicates, via a communication memory bus, with a communication memory a first part of which is reserved for the communication software which is stored as the primary program. A second part of the communication memory is reserved for the process control software which is stored at least partly as the secondary program for the process to be executed in the station connected to the interface, the protocol control unit consisting of a modem control unit for writing and reading the bit stream received and to be transmitted, respectively, into and from the communication memory, a communication control unit for coordinating the operations of the modem control unit and for ensuring the execution of the primary and the secondary program, and a communication memory bus control unit for assigning time slots for access to the communication memory in response to relevant requests from the modem control unit and the communication control unit, the modem control unit interrupting the execution of the secondary program in the communication control unit each time when a communication instruction is to be executed for the relevant station, after which the communication control unit executes the primary program but continues the execution of the secondary program during waiting periods in the execution of the primary program, for which purpose there is provided a further memory for memorizing the location where and the circumstances under in the primary and the secondary program have been interrupted.

12 Claims, 8 Drawing Sheets

INTERFACE DEVICE FOR INTERFACING A NETWORK STATION TO A PHYSICAL NETWORK MEDIUM

BACKGROUND TO THE INVENTION

The invention relates to an interface device for interfacing a network station to a physical network medium. The network may be a ring, star, bus or other type set-up, notably in an LAN-environment, and represented by a coax cable, twisted wire pair, optical fibre, or other. The station in particular may be an industrial station, for example, a sensor, drive unit, machine, material management unit, computer, display screen station etc.

For fast and comparatively simple message traffic between the various stations and the International Standards Organisation has drafted recommendations in the Open Systems Interconnection (OSI) model. This OSI model provides recommendations for a structure consisting of seven layers. For example, layer 1 relates to the physical communication between the stations and layer 2 relates to the Medium Access Control (MAC) and the Logical Link Control (LLC); these recommendations define the accessing of the network for the transmission of messages. For the present invention layers 3 to 6 are not practically important, layer 7 concerns the application software for controlling the functions of the relevant stations.

The OSI recommendations are standardized in various protocols for use in a LAN. Two examples are MAP (Manufacturing Automation Protocol) and Ethernet. MAP is a token passing protocol whose layer 1 and Medium Access Control (MAC) (the lower half of layer 2) are described in IEEE Std. 802.4. Ethernet is based on a Carrier-Sense Multiple Access with Collision Detection (CSMA/CD) system. For Ethernet and similar protocols, for example TOP (Technical and Office Protocol), the physical execution and the MAC are described in IEEE Std. 802.3. MAP and Ethernet use the same Logical Link Control (LLC) (the upper half of layer 2) as described in IEEE Std. 802.2.

In layer 1 of the OSI recommendations the signals are applied to the physical medium via modulator, as a bit stream that is demodulated in a receiving station. In the case of MAP, bit rates are from 1.5 to 10 Mbit/s Ethernet from 5 to 10 Mbit/s. Various modulation techniques can be employed, such as amplitude modulation techniques (for example non return to zoro, NRZ) or frequency modulation techniques (for example Frequency Shift Keying, FSK). At present phase-continuous FSK modulators NE 5080/5081 by Signetic comply with IEEE Std. 802.4, and also the phase-coherent carrier band modem (CBM) by Motorola. Known hardware for implementing layer 2 is still not cost-effective for simple applications, for example MC 68824 (by Motorola), that is compatible to the CMB modem. Using this unit, the LLC operations and those of the higher OSI layers must be accommodated in additional station hardware (See also: Computer Design, Feb. 1, 1986, pages 69-73, and IEEE Micro, June 1986, pages 15-25).

SUMMARY TO THE INVENTION

It is an object of the invention to provide an interface device which efficiently uses the hardware present in first instance for implementing layer 2 of the OSI recommendations, so that it is less expensive than existing hardware.

According to one aspect of the invention there is provided an interface device for interfacing a network station to a physical network medium comprising a demodulator for converting network signals into an input bit stream, a modulator for converting an output bit stream into further network signals, said device comprising a protocol unit connected to said modulator/demodulator, a communication memory communication with said protocol unit over a communication memory bus, said communication memory comprising a first part for storing communication software as a primary program, wherein a second part of the communication memory is reversed for the process control software which is stored at least partly as the secondary program for a process to be executed in the station connected to the interface device, the protocol control unit comprising a modem control unit for writing the bit stream received and into and reading the bit stream to be transmitted from the communication memory, respectively, a communication control unit for coordinating the operations of the modem control unit and for ensuring the execution of the primary and the secondary program, and also a communication memory bus control unit for assigning time slots for access to the communication memory to the modem control unit and the communication control unit upon their respective requests, the modem control unit interrupting the execution of the secondary program in the communication control unit each time when a communication instruction is to be executed for the station, after which the communication control unit executes the primary program but continues the execution of the secondary program during waiting periods in the execution of the primary program, for which purpose there is provided a further memory for memorizing the location where and the circumstances in which the primary and the secondary program have been interrupted.

Waiting times are to be understood to mean the intervals in the execution of a single communication instruction as well as the interval between the execution of two communication instructions to be executed for the station.

As a result of this construction, the protocol control unit can execute the MAC as well as the LLC in accordance with layer 2 of the OSI instructions and also the Station Management, that is to say in the primary program, and also, when the protocol control unit is not engaged in these operations or must wait during the execution of these operations, the process control for the connected station in accordance with the layer 7 of the OSI recommendations, that is to say in the secondary program. The primary program may never be interrupted, but can insert waiting periods for itself; the secondary program can always be interrupted at any instant. If the process control for the relevant station cannot be interrupted, use can be made as yet of an additional computer system associated with the relevant station. Then protocol control unit will also comprise an additional control unit for the exchange of data with the additional computer system. The modem control unit and the additional control unit can be considered I/O units for the communication control unit which is actually formed by a microprocessor.

Furthermore, the protocol control unit is constructed so that it is suitable for connection to said known modulator/demodulator modules; furthermore, the lay-out of the messages to be processed may be based on any known protocol, so that the protocol control unit can be used in any system based on the OSI recommendations. The protocol control unit is preferably accommodated on a single chip.

BRIEF DESCRIPTION OF THE FIGURES

The invention will be described in detail hereinafter with reference to the embodiments shown in the accompanying drawings, based on a token passing bus system in accordance with IEEE Std. 802.4.

Corresponding components in the various Figures are denoted by corresponding reference numerals. The invention is by no means restricted to the embodiments to be described with reference to the drawings; these embodiments merely serve to illustrate the invention.

DESCRIPTION OF A PREFERRED EMBODIMENT

Figure 1:
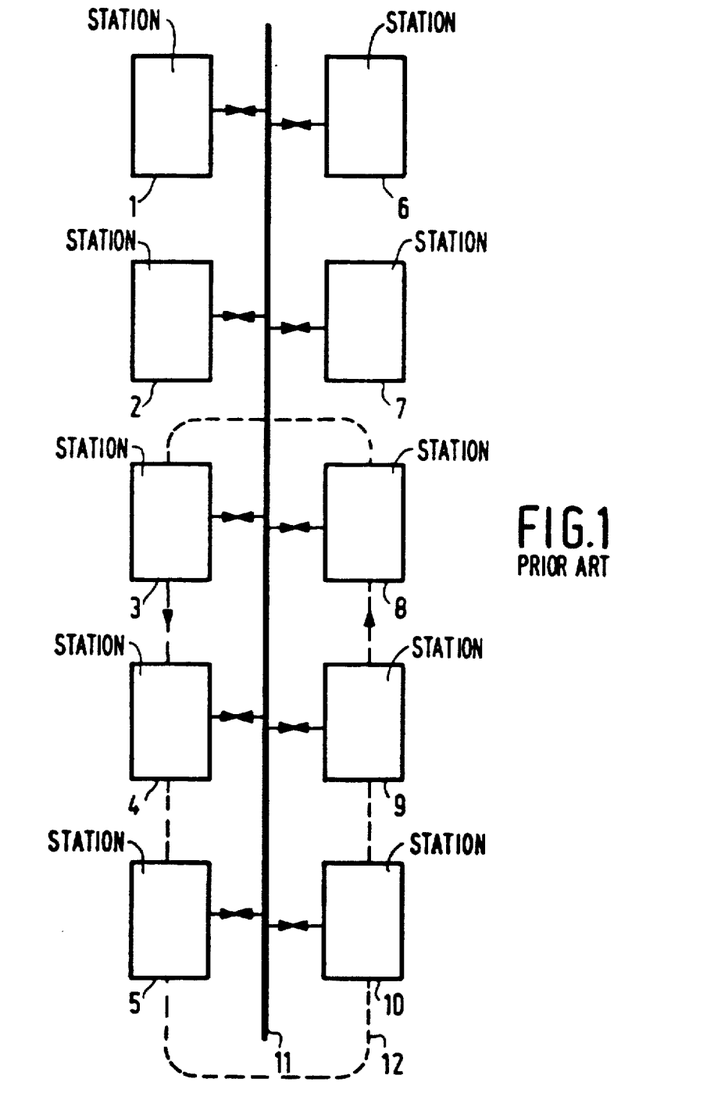
FIG. 1 shows a token passing bus system.

FIG. 1 shows a LAN based on a token bus passing system, based a coax cable 11. Stations 3-5, 8-10 circulate the token as represented by logic ring 12. Other stations 1, 2, 6 and 7, therefore, can only receive messages. However, they can also be included in the logic ring 12 when the token has circulated through the logic ring a number of times. This aspect will be described in detail hereinafter.

Figure 2:
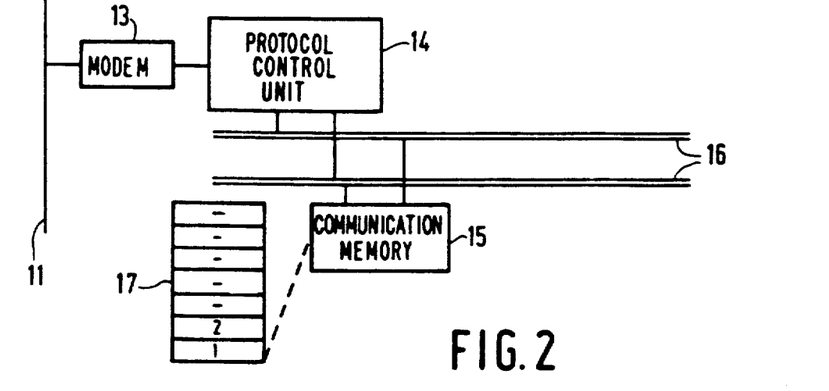
FIG. 2 shows an interface in accordance with the invention for a station of FIG. 1.
Figure 3:
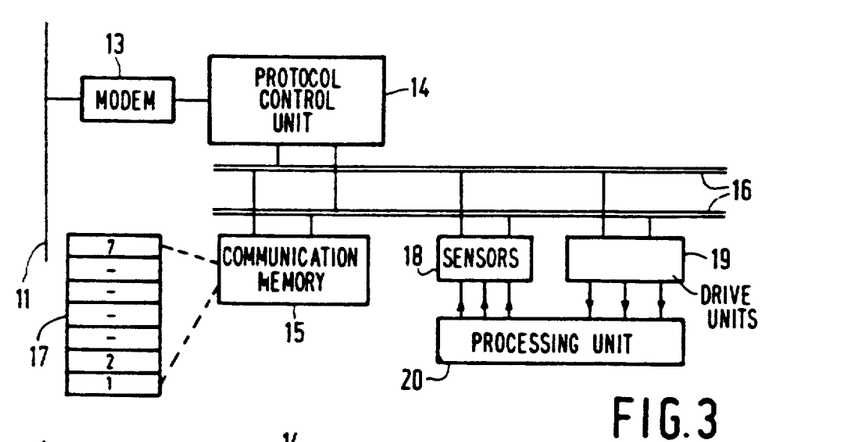
FIG. 3 shows the same interface as FIG. 2, the relevant station now being connected directly thereto.
Figure 4:
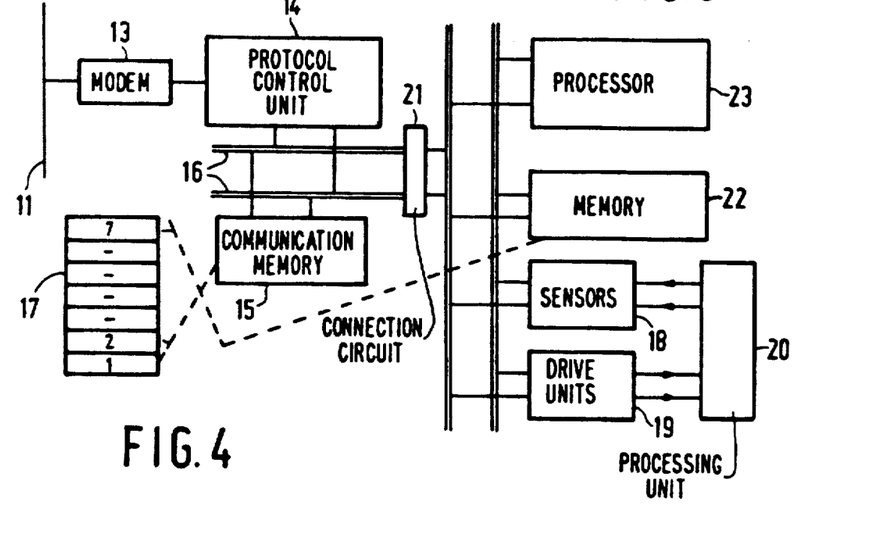
FIG. 4 shows the same interface as FIG. 2, the station being connected to the interface via a special connection circuit, and being controlled by an additional computer system forming part thereof.

FIG. 2 shows an interface device for the connection between one of the stations and cable 11. The interface comprises a modem 13, protocol control unit 14, communication memory 15, and communication memory bus 16. Communication memory 15 contains the communication software for the protocol control unit 14. The list of OSI recommendations is denoted by the reference numeral 17. The hardware of the interface is in accordance with layer 1 of the OSI recommendations, the recommendations for layer 2 being taken up in the communication software stored in the communication memory 15. FIG. 3 shows the same interface configuration as FIG. 2, a station being connected directly to the communication bus 16, which station is formed by sensors 18, drive units 19 and a processing unit 20 which is controlled by means of the former units. The control program for this station is in accordance with layer 7 of the OSI recommendations and is stored in the communication memory 15. This process control program is executed in the protocol control unit 14, unless messages are to be transported via the cable 11. The process control program, being the secondary program, therefore, should be such that it can always be interrupted at any instant; this fact determines the construction of the protocol control unit 14. The execution of the communication program, the primary program, includes waiting times during which the secondary program can be executed. The process taking place in the station can be non-interruptible or non-interruptible for the time required for the message traffic; in that case the process control program should be (possibly partly) executed in an additional computer system forming part of the station. FIG. 4 shows the same interface configuration as FIG. 2, the station formed by said units 18, 19 and 20 and the additional computer system consisting of a memory 22 and a processor 23 being connected to the communication memory bus 16 via a connection circuit 21.

Figure 5:
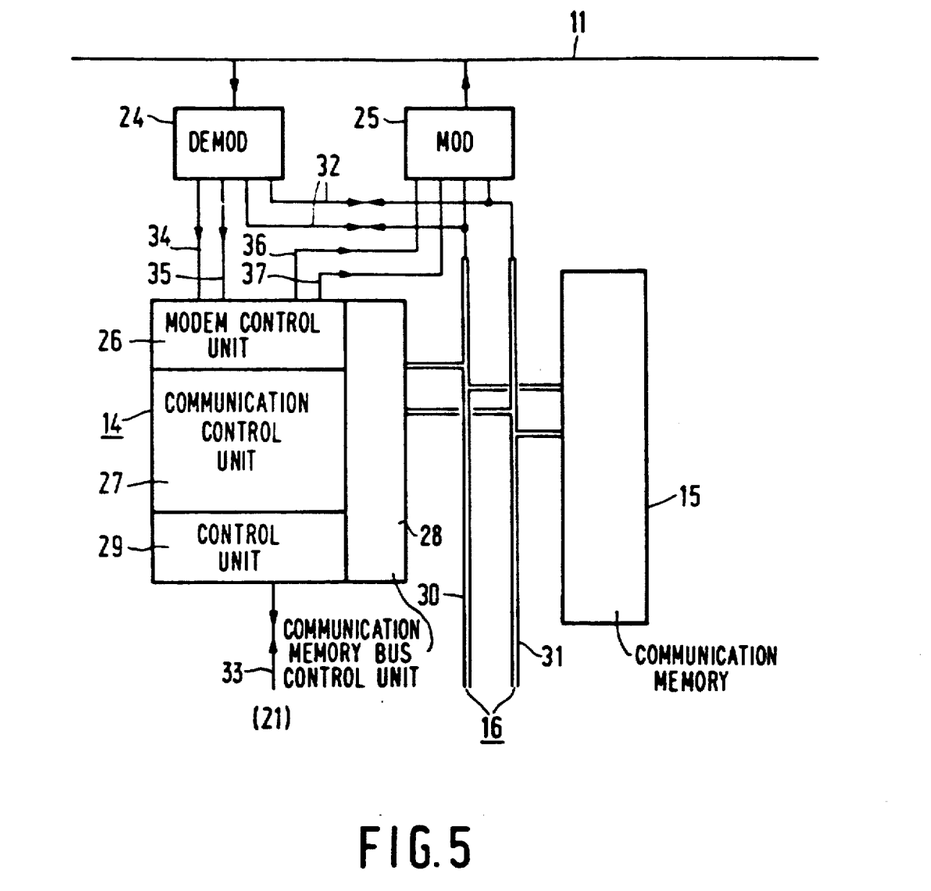
FIG. 5 shows an interface in accordance with the invention in greater detail.

FIG. 5 is a more detailed representation of an interface device in accordance with the invention. A demodulator 24 and a modulator 25 are connected to the cable 11. The protocol control unit 14 consists of a modem control unit 26, a communication control unit 27, a communication memory bus control unit 28 and a control unit 29 for the connection to an additional computer system. The communication memory bus 16 is now formed by a 16 bit data bus 30 and a 16 bit address bus 31. Four wires of these buses from a modem adjustment bus 32. The sensors 18 and the drive units 19 (see FIG. 3) can be connected directly to the data bus 30 and the address bus 31. When the connected station comprises an additional computer system, the connections between the station and the interface extend via the connection circuit 21 (see FIG. 4) which is controlled by the additional control unit 29 via the lead 33.

The demodulator 24 derives a serial bit stream from the signals applied via the cable 11, which stream is applied to the modem control unit 26 via the lead 34; via the lead 35, a receive clock signal Clr, also derived from the incoming data, is applied to this modem control unit. From the modem control unit 26 a serial bit stream is applied, via the lead 36, to the modulator 25 in which this bit stream is converted into signals to be transmitted via the cable 11; via the lead 37, a transmission clock signal Clt to be added to the data to be transmitted is also applied from the modem control unit 26 to the modulator 25.

Figure 6:
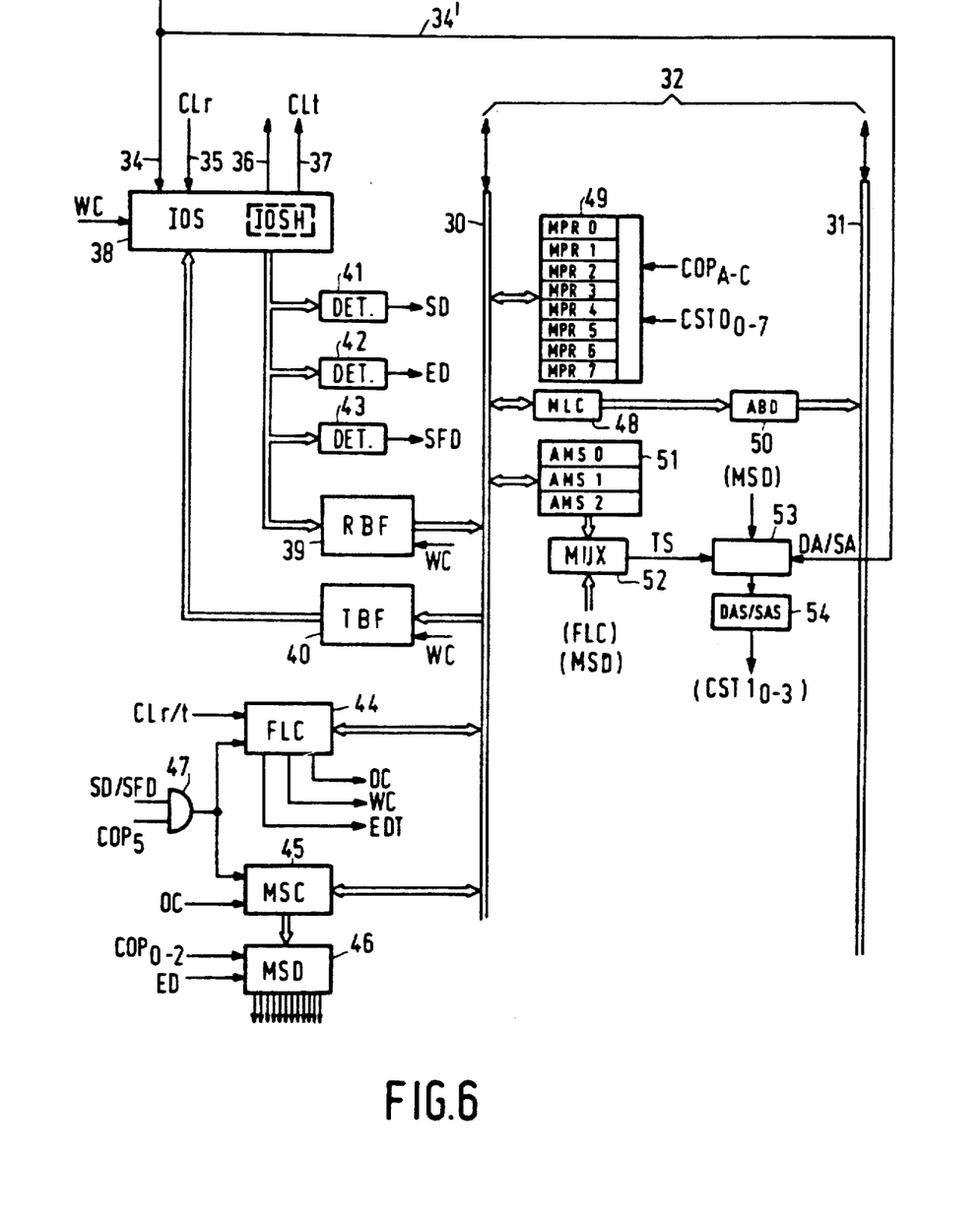
FIG. 6 shows a detailed diagram of the modem control unit in the protocol control unit of the interface in accordance with the invention.
Figure 7A:
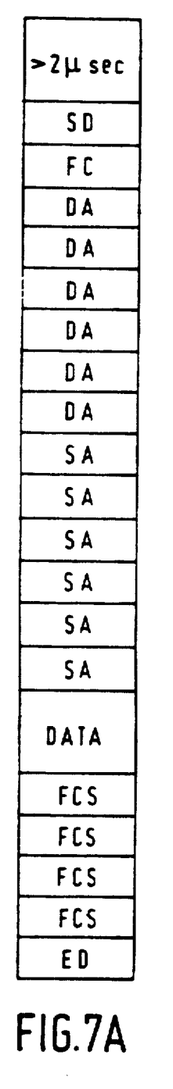
FIGS. 7a, 7b, 7c and 7d show the frame lay-out of the messages in accordance with MAP and TOP.
Figure 7B:
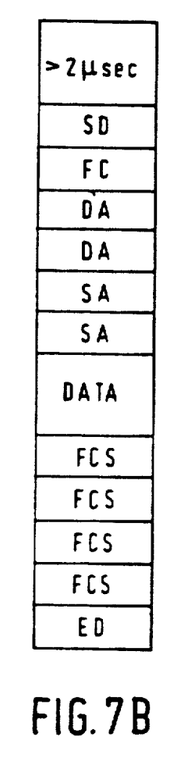
Figure 7C:
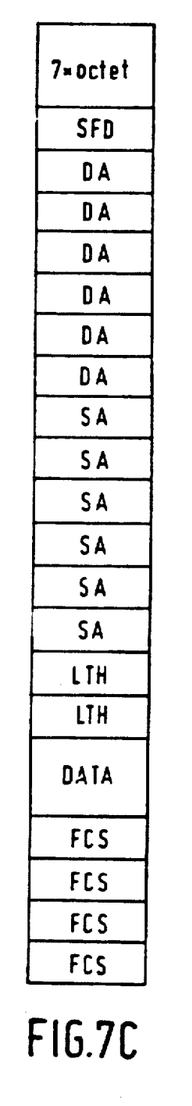
Figure 7D:
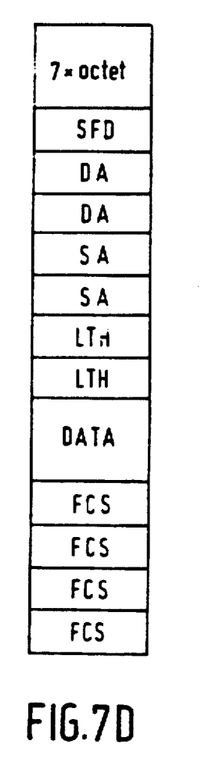

FIG. 6 is a more detailed representation of the construction of the modem control unit 26. It comprises a 16 bit shift register (IOS) 38 for converting each time 16 bits received in series from the modulator 24 into one 16-bit word and, conversely, for converting the 16-bit words into a serial bit stream to be applied to the modulator 25. This process is synchronized by means of the clock signals Clr and Clt. Before the storage of the 16 bit words received via the data bus 30 in the communication memory 15, they are buffered in the receive buffer register (RBF) 39, there being provided a transmission buffer register (TBF) 40 for buffering the 16-bit words, read from the memory 15 and applied via the data bus 30, before the bit-wise transmission of these words by means of the IOS register 38.

In MAP the demodulated signals imply data bits "1" or "0" and so-called non-data bits; the latter bits are lacking in TOP (see: Computer Design, Feb. 1, 1986, pp. 69-73). For MAP the register 38 also comprises an additional 8-bit shift register section (IOSH) for recognizing the non-data bits; for transmission these non-data bits must be generated again in this shift register section. The non-data bits are not transferred to the buffer register 39; they merely have a function for detecting the beginning and the end of a message frame, which is composed of a series of bit octets specifically defined for each of the protocols to be used. The detection of the beginning of a frame in MAP takes place in the circuit 41; as soon as a specific bit pattern is detected in the first bit octet (SD octet), together with a specific octet of non-data bits applied in parallel therewith, the signal SD is supplied. The detection of the end of a frame in MAP takes place in the circuit 42; as soon as a specific bit pattern is detected in the last bit octet (ED octet), together with a specific octet of non-data bits applied in parallel therewith, the signal ED is output. In TOP the beginning of a frame is detected in the circuit 43; when a specific bit pattern is detected in the first bit octet (SFD octet), a signal is supplied; in this protocol the end of the frame is indicated by specific octets (LTH octets) which form part of this frame and which govern the length of the further message.

FIG. 7 shows the frame lay out for MAP and TOP. An SD (or SFD) octet is followed by successively an FC octet (only in the case of MAP), two or six destination address DA octets, two or six source address SA octets, an indefinite number of data octets, four checksum FCS octets and one ED octet (only for MAP). For TOP the indefinite number of data octets should be supplemented in order to form the number determined by the LTH octets. The meaning of the SD, SFD, ED and LTH octets has already been stated; the meaning of the other octets will be given hereinafter. FIG. 7A shows a MAP frame with 48-bit addressing; FIG. 7B shows a MAP frame with 16-bit addressing; FIG. 7C shows a TOP frame with 48-bit addressing; FIG. 7D shows a TOP frame with 16-bit addressing. For MAP the frame is preceded by a preamble having a duration of at least 2 μs; for TOP the preamble always has a duration of seven octets. Before the arrival of the first octets of the frame the receive clock signal should be present because otherwise octets would be lost. During the preamble this clock signal is generated from a succession of alternating ones and zeroes.

Referring to FIG. 6 again the modem control unit 26 comprises a frame counter (FLC) 44, a modem status counter (MSC) 45, a modem status decoder (MSD) 46, and an AND-gate 47. The frame length counter 44 counts the bits arriving, outputs signals OC and WC when an octet or a 16-bit word has arrived, and is preset via the AND gate 47 after the signal SD (or SFD) has been supplied and the communication control unit 27 has granted approval, by way of bit 5 of the communication operation register (COP) forming part of the communication control unit 27, the counting pulses derived from said clock signals Clr,Clt. The signal WC is derived from the four least significant bits of this counter, which signal is used for controlling the series/parallel conversion, for writing the 16 bit words in the buffer register 39 and 40, and for claiming the bus of the communication memory. In the modem status counter 45 the octets arriving are counted, for which purpose there are provided the signals OC of the frame length counter 44 as counting pulses; the modem status counter 45 receives the same preset signal as the frame length counter 44. Because a specific action must be undertaken each time when an octet (FC) or a defined group of octets (DA or SA) has arrived, the timing signals required for this purpose are supplied by the modem status decoder 46; this takes place, in dependence of the protocol used. In the communication operation register (COP) the bits 0-2 determine the protocol; these bits are used for co-determining the modem status decoding process. When all data octets have arrived, the modem status decoder 46 no longer outputs timing signals before the end of the frame has been detected by the signal ED. When a frame is to be transmitted, the frame length is inserted into the frame length counter 44, after which the transmitted bits are counted down and ultimately a signal EDT is supplied in order to indicate that the frame has been completely transmitted.

The modem control unit 26 also comprises a modem location register (MLC) 48 which indicates the location of the 16 bit words in the communication memory 15. In response to each next 16 bit word to be written or read, the position of this register is incremented. When the signal SD has been output and the reception of the FC octet has been detected (the latter only in the case of MAP), the modem location register 48 is preset. The preset values are stored in the modem preset registers (MPRO-6) 49. The selection of these registers is performed by the bits COPa-c of said communication operation register (COP). For MAP the preset value for the modem location register 48 depends on the type of frame, i.e. on whether the frame is a MAC frame or contains data concerning "station management" or LLC or serves for special purposes. The frame type is determined by decoding the FC octet; the FC octet bits are registered in the bits 0-7 of the communication status register (CST0) forming part of the communication control unit 7. There are situations in which the frame data is to be stored in a given location in the communication memory 15, regardless of the frame type; the frame type decoding is then overruled by the bits COPa-c. For TOP only the modem preset register MPRO is used for supplying the preset value for the modem location register 48. It is to be noted that, after the signal SD (or SFD) has been issued, first the data bus must be claimed in order to preset the modem location register 48, before storage in the communication memory 15 can take place. The modem location register 48 is also used for selecting the words to be read and transmitted; this register is then directly preset by the communication control unit 27. The addressing by the modem location register 48 takes place via the address bus control (ABD) 50.

The modem status decoder 46 indicates when the 2 or 6 DA and SA octets, that is to say the 16 bit or 48 bit "destination" address (DA) and "source" addresses (SA) arrive. These address codes indicate the address or rank number (DA) of the station for which the message is intended or the address or rank number (SA) of the station wherefrom the message originates, respectively. The address codes are compared, at the instant determined for both addresses by the modem status decoder 46, with the contents of the 16-bit address mask registers (AMSO-2) 51 forming part of the modem control unit 26. The contents of these address mask registers indicate the address (TS) of the connected station. The bit demultiplexer 52, being controlled by the five least significant bits of the frame length counter 44, selects the address bits of TS in series from the address mask registers 51 at the instant determined by the modem status decoder. These address bits are compared one by one with the bits of the address codes DA an dSA, that is to say in the comparator 53 and starting with the least significant bit. Therefore, these address codes should also be supplied in series; at the instant determined by the modem status decoder, the DA and SA bits are applied in series to the comparator 53 via the lead 34'. The results of this comparison process are stored in the DA or SA status register (DAS/SAS) 54. This register indicates whether DA=TS or whether DA<TS, SA=TS or SA>TS. This data is subsequently stored in the communication status register (CST1) forming part of the communication control unit 27, that is to say in the bits 0-3. The bits indicating that DA=TS or SA=TS can be used directly for the interrupt mechanism for interrupting the secondary program and for returning to the primary program as soon as the address of the relevant station has been recognized, the bits indicating that DA<TS and SA>TS being used directly for including a relevant station in the logic ring.

The last task of the modem control unit 26 is the execution of the FCS calculation and the checking of the result on the basis of the contents of the four FCS octets. For this check calculation, being irrelevant for the invention, reference is made to "Orange Book, Vol. VIII.2 of CCITT", section 2.2.7.

When a frame has been received and it appears from the destination address (DA) that this frame is of importance for the connected station, the modem control unit 26 interrupts the secondary program being executed by the communication control unit 27. The communication control unit 27 then saves the contents of the various registers which are of importance for the later, further execution of the secondary program and starts to follow the primary program, i.e. it starts the analysis of the data stored in the communication memory 15 by the modem control unit 26.

When the frame received is a MAC frame, the 16 bit words are stored directly in the memory locations indicated, after which the MAC frame is processed by the communication control unit 27 and a response is prepared if at least the FCS check is positive. When the frame received is an LLC frame, a station management data frame or a special purpose data frame, the 16 bit words are stored directly in a FIFO register in the communication memory 15. The communication control unit calculates the appropriate starting address (data offset) for the modem control unit. For each FIFO register the communication control unit updates a further register (directory register) in which the first address and the length of each data frame is indicated. During these operations the modem control unit 26 and the communication control unit 27 operates in parallel, each unit having access to the communication memory 15 during the allocated time slot.

When a frame is to be transmitted, it is first composed in a part of the communication memory especially assigned for this purpose. The communication control unit 27 ensures that the modem control unit 26 transmits a frame having the desired number of octets from the specific memory locations. After having given the relevant instruction, the communication control unit returns to the secondary program abandoned because an important frame was received to which a reply had to be given. The modem control unit subsequently executes the transmission and can be programmed so that it can directly interrupt the execution of the secondary program again after the transmission of the ED octet of the frame. During the transmission of messages the modem control unit and the communication control unit again operate in parallel and communicate with the communication memory in the assigned time slots.

As has already been stated, program interruptions may occur during the execution of the secondary program by the communication control unit. When the communication control unit is activated, it is destined for the execution of the primary program as a result of a master reset signal applied. The primary program can be abandoned only by the execution of an instruction SCND(x). The operand (x) is taken over in an interrupt mask register (IMS) forming part of the communication control unit; this operand indicates the events in the modem control unit which when they occur, give rise to an interruption of the secondary program, thus causing a change over to the execution of the primary program. Moreover, other events may occur, also indicated in the interrupt mask register (IMS) which may cause an interruption of the execution of the secondary program. The interruption takes place after execution of the current instruction. For the execution of interruptions other than by the primary program an interrupt sub-routine is used, the first instruction of which is stored in an interrupt address register (IAR) forming part of the communication control unit. This interrupt sub-routine forms part of the secondary program so that it can be interrupted in view of the events in the modem control unit as indicated by the operand (x) of the instruction SCND(x).

When the primary or secondary program is interrupted, the location where and the circumstances in which these programs are interrupted must be saved in a memory especially provided for this purpose. Preferably one third of the communication memory 15 is reserved for this purpose. When the instruction SCND(x) is executed, the position of a normally present program counter and the contents of the various registers, necessary for the later further execution of the primary program, are saved in a primary stack in the communication memory 15. When the secondary program is interrupted by events in the modem control unit or by other permanently defined events, the position of the program counter and the contents of the various registers necessary for the later further execution of the secondary program are saved in a secondary stack in the communication memory 15. When the interruption is caused by the modem control unit, the secondary stack is blocked and the primary stack is released; in the other cases the secondary stack remains in the released state.

Figure 8:
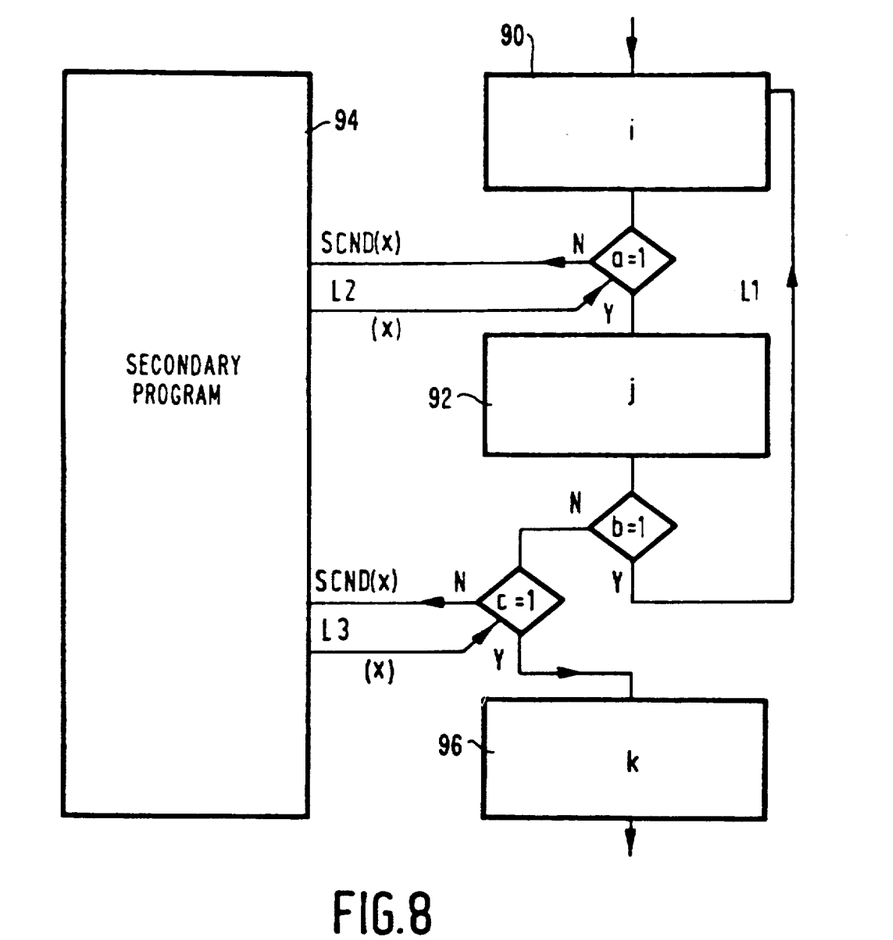
FIG. 8 diagrammatically shows the interruption mechanism.

The interruption process can be illustrated on the basis of the diagram shown in FIG. 8. The execution of the primary and secondary program can then be considered as a "finite state machine". Such a finite state machine can also be represented by flowcharts. When the finite state machine is in the state i for the primary program, which means that the program block 90 of the primary program has been executed, the situation may occur where in order to satisfy a given condition (a=1) the program block 92 of the primary program is executed or the "finite state machine" is set to the state j, and where non-compliance with said condition (a=0) causes abandoning of the primary program by the instruction SCND(x). The operand (x) then indicates that the secondary program is to be interrupted as soon as subsequently a=1; -a- indicates an event or combination of events indicated in the interrupt mask register (IMS). The secondary program is shown in the form of a block 94 in FIG. 8 because the execution of the primary program cannot be synchronized with that of the secondary program; it is not known when the interrupt events (x) occur, so in which state the secondary program is abandoned after expiration of the waiting period L2, and where the secondary program must be resumed at the beginning of the next waiting period L3. FIG. 8 also shows how the primary program blocks must be passed through again in order to satisfy a given condition (b=1) (for example, when data is requested in block i, this data is received in block j, and it appears that this data is not correct so that the request for data is repeated) and how, if b=0 depending on a further condition (c=0) the primary program can be abandoned for an indefinite waiting period L3 or, if c=1, the primary program block 96 can be executed.

The various circumstances giving rise to an interruption of the secondary program and being indicated in the operand (x) will now be considered.

After a given period of time (for example each time when the token has circulated one hundred times) all stations included in the logic ring ("station in ring" is updated in bit b of the communication status register (CST1)) transmit a MAC frame (in MAP a so-called "solicit-successor frame") whereby new stations are converted to participate in the logic ring. Such an active station in the logic ring, therefore, requests an extension of the logic network; however, not all stations outside the ring are invited but only the stations in a given range whose boundaries are determined by the SA code of the active station and the DA code of a next station included in the ring as included in the -solicit successor- frame. When the solicit successor frame (indicated by the FC octet and registered in the bits 0-7 of the communication status register (CST0)) is recognized and said address range boundaries are determined by the relevant station (and registered in the bits 1 and 3 of the communication status register (SCT1)) and the station also wishes to be included in the logic ring ("in ring desired", indicated in bit 3 of the communication operation register (COP)), all conditions giving rise to an interruption have been satisfied; in that case a first logic circuit, forming part of the logic means in the communication control unit, detects correspondence with the relevant bit indicating the states event (bit 4), which bit has been taken over from the operand (x) in the interrupt mask register (IMS). The secondary program is interrupted and the primary program ensures that a message is transmitted to the sender of the solicit successor frame, the address code SA becoming that of TS of the solicit successor frame and the address code DA becoming that of SA of the latter message. In MAP this message (a MAC frame) is a so-called "set-successor frame"; the transmission of this message implies that its sender forms part of the logic ring. After reception of this message by the receiver, the token is passed to the transmitter of the set-successor frame. However, it may be that the token is not accepted by the sender of the set-successor frame. If it is not accepted even after a second attempt, the station possessing the token transmits a message indicating that the predecessor of the station in the logic ring taking up this message has been rejected from the logic ring (a so-called "who follows frame" in MAP). In this MAC frame the address code of the "next" station is included in the data field; this is because each station in the logic ring memorizes which station is the preceding station and which station is the next station in the ring. When the connected stations recognize the "who follows frame" on the basis of the FC octet, in these stations the data field of the frame is compared with the address code of the "preceding" station registered in the station. In the station in which this comparison offers a positive result, the secondary program is interrupted. The primary program in this station, obviously being the successor to the station which does not reply, transmits a set-successor ring to the station having the token, after which the station having transmitted the latter frame receives the token. The described interruption event is taken over from the operand (x) in bit 3 of the interrupt mask register (IMS). On the basis of this bit the occurrence of said event is detected by means of a second logic circuit which forms part of the logic means in communication control unit.

When the station possessing the token does not transmit a solicit successor frame, the token is passed on to the "next" station in the ring. If this station does not accept the "token", a "who follows frame" is transmitted again in the desired manner. The passing of the token to a next station is realized by means of a token frame which is recognized as such on the basis of the FC octet. After reception of this MAC frame, the secondary program is interrupted as soon as, after the reception of an SD signal, the correspondence DA=TS is detected (and registered in the bit 0 of the communication status register (CST1)). The described interruption event is taken over from the operand (x) in the bit 1 of the interrupt mask register (IMS). On the basis of this bit the occurrence of said event is detected by a third logic circuit which forms part of the logic means in the communication control unit.

Figure 10:
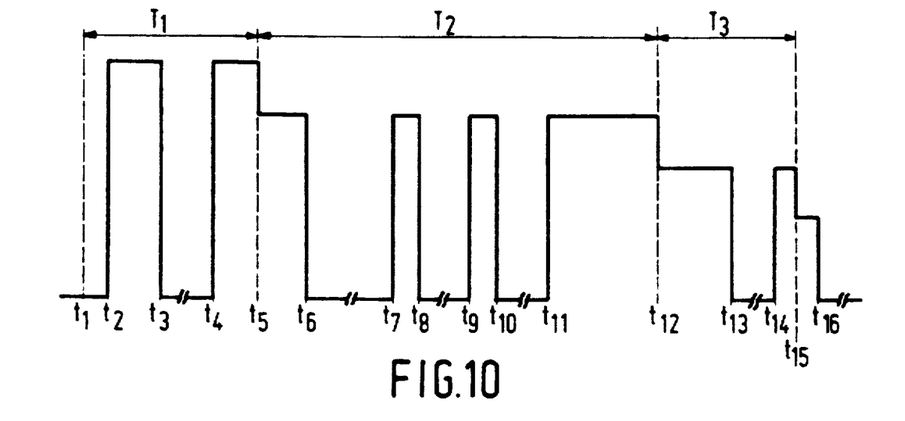
FIG. 10 shows a diagram illustrating a time division between the execution of the primary and the secondary program in a given situation.

In the diagram of FIG. 10 it has been assumed that the arrival of a token frame is signalled at the instant t1 and that the communication control unit follows the secondary program; at the instant t2 the secondary program is interrupted after address recognition of the token frame; In the primary program the preparation for the further processing of the token frame arrived must be made, after which the secondary program can be resumed (instant t3) while awaiting the writing of all data and the detection of the ED signal indicating the end of the frame arriving. When, after the token frame has been received and written, the end of this frame is detected, the secondary program is interrupted again; in FIG. 10 this takes place at the instant t4. The present interrupt even is taken over from the operand (x0 in the bit 7 of the interrupt mask register (IMS). On the basis of this bit the occurrence of said event is detected by a fourth logic circuit which forms part of the logic means in the communication control unit. After the storage of the token frame, this frame is analysed (including for example the adaptation of the registration of the "previous station in the ring") and tested. It is assumed that these actions are terminated at instant t5. Therefore, a total period of time T1=T5−t1 is required in order to obtain the token. Subsequently, there is the period T2 for exercising the rights issuing from the possession of the token. First it is checked in the primary program whether a message is to be transmitted, this message is then assigned to the modem control unit by the communication control unit. When this has taken place, the message, formed by an LLC command frame, can indeed be transmitted and at the same time the communication control unit can initiate the continuation of the secondary program (instant t6). As soon as the ED octet has been transmitted and hence it has been detected that the entire message has been transmitted, the secondary program is interrupted again (instant t7). This interrupt event is also taken over from the operand (x) in the bit 7 of the interrupt mask register (IMS). The occurrence of said event is detected in the fourth logic circuit on the basis of this bit. Subsequently, in the primary program the reception on an LLC response frame is prepared; for example, the clock which forms part of the communication control unit and which serves to define the maximum period of time within which the response must have arrived (watchdog timer) is adjusted. When these preparations have been made, the secondary program can be resumed (instant t8) while awaiting the response frame. As soon as this response arrives, i.e. after the SD signal and the address identification DA=TS (instant t9), the secondary program is interrupted again. This interrupt event is taken over from the operand (x) in the bit 1 of the interrupt mask (IMS). On the basis of this bit the occurrence of said event is detected by the third logic circuit. However, if the time adjusted by the watchdog timer is exceeded without arrival of the response, the secondary program is interrupted and the command frame is transmitted again. This interrupt event is taken over from the operand (x) in the bit 6 of the interrupt mask register (IMS). On the basis of this bit the occurrence of said event, i.e. the exceeding of the time adjusted by the watchdog timer, is detected by a fifth logic circuit which forms part of the logic means in the communication control unit. When the response frame fails to appear even after this procedure has been repeated a number of times, this failure is indicated to the station; this message is transmitted in a higher layer of the OSI recommendations. Subsequently the token is passed on.

When the response frame is identified at the instant t9, which means that the destination address code therein is recognized, the primary program makes the preparations for the further processing of this message. When this has taken place (instant t10), the secondary program is resumed while awaiting the writing of the entire frame and the appearance of the ED signal. At the instant (t11) the secondary program is interrupted again, that is to say by the interrupt event registered in the bit 7 of the interrupt mask register (IMS). During the subsequent primary program, the data received is processed and tested after which the reception is signalled to the relevant station. At the instant t12 these operations have been completed and the period T2=T12−t5 for exercising the rights issuing from the possession of the token has expired and the token can be passed on. First there will be the preparatory activities for passing on the token; when these activities have been completed (instant t13) the MAC token frame is transmitted, and at the same time the secondary program can be resumed until the entire token frame has been transmitted and the ED octet thereof has been detected. The secondary program is then interrupted again (instant t14). This interrupt event is again registered in the bit 7 of the interrupt mask register (IMS). In the primary program the completion of the events following the transmission of the token frame takes place, after which at the instant t15 the preparations are made for checking whether the token has been taken over. When these preparations have been made (instant t16), the secondary program is resumed, awaiting the detection of the presence of a message on the cable. When the token has been taken over, the station possessing the token will despatch a message for some further station; all stations connected detect this message and generate the SD signal in their modem control unit. When the latter signal is detected in the station having passed the token, the secondary program is interrupted therein in order to allow the primary program to register that the token has been passed on and possibly also how often this passing on has been attempted. This interrupt event is registered from the operand (x) in the bit 0 of the interrupt mask register (IMS). On the basis of this bit the occurrence of said event is registered by a sixth logic circuit which forms part of the logic means in the communication control unit.

If in the station wishing to pass the token no SD signal is received within a period of time set by the watchdog timer, the secondary program in this station is interrupted and it is established that the station still possesses the token; the station then attempts to pass the token as yet to the "next" station. If this fails again, a "who follows frame" is transmitted in the described manner. This interrupt event is registered, as has already been stated, from the operand (x) in the bit 6 of the interrupt mask register (IMS). On the basis of this bit the occurrence of said event is registered in the fifth logic circuit.

Figure 11:
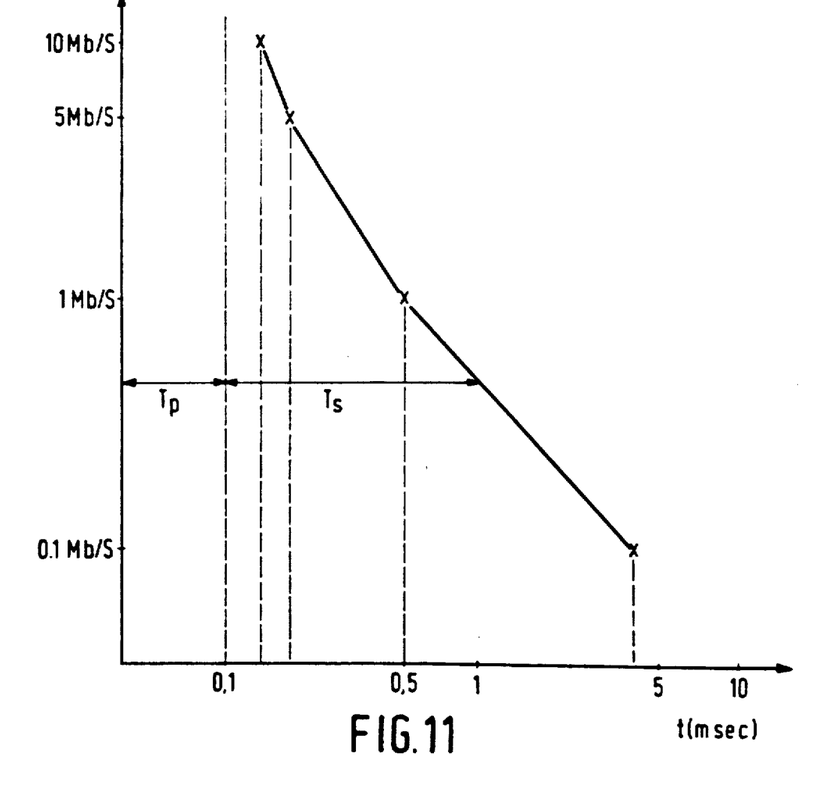
FIG. 11 shows a diagram in which the saving in time, being the degree to which the time is effectively used by executing the primary and the secondary program in parallel, is given as a function of the bit rate.

The period of time T3=t15−t12 represents the period of time necessary for passing on the token. The time T1+T2+T3 represents the token-hold time. The part of the token-hold time during which the primary program is followed, i.e. Tp, is determined by the 10 MHz clock of the system so that it can be accurately determined on the basis of the number of program steps to be executed. The part of the token-hold time during which the secondary program is executed, i.e. Ts, however, depends on the bit rate used for the writing and reading of the messages. In FIG. 11 the token-hold time Tp+Ts is given for various bit rates, Tp being constant and Ts increasing as the bit rate is lower. For a bit rate of, for example 1 Mbits/s, 0.4 ms can be spent on the execution of the secondary program during the waiting periods in the execution of the primary program, which in this case requires 0.1 ms. This situation illustrates the degree to which effective use is made of the time in the interface in accordance with the invention.

In the foregoing it has been indicated how the various interrupt events are registered in the various bits of the interrupt mask register; in the present example these were the bits 0, 1, 3, 4, 6 and 7. All these interrupt events related to MAP. Evidently, more interrupt events can be programmed. For example, the interrupt event registered in the bit 1 can be extended to address identifications where DA can indicate not only a single station (TS) but also a group of stations or even all connected stations. Another interrupt event for MAP occurs in the so-called resolve contention procedure for determining, which station is ultimately granted the token when a plurality of stations in the address range determined by DA and SA wish to be included in the logic ring. Another interrupt event for MAP occurs when the token is lost; one given station is then first warned that no further messages will appear on the cable and it subsequently claims the token (by means of a MAC claim token frame) and obtains the token, after which the logic ring is composed again by means of solicit successor frames. Furthermore, for other protocols associated interrupt events can be defined. Because of the programmability of the interrupt events the network system is extremely flexible and suitable for adaptation to different protocols.

Figure 9:
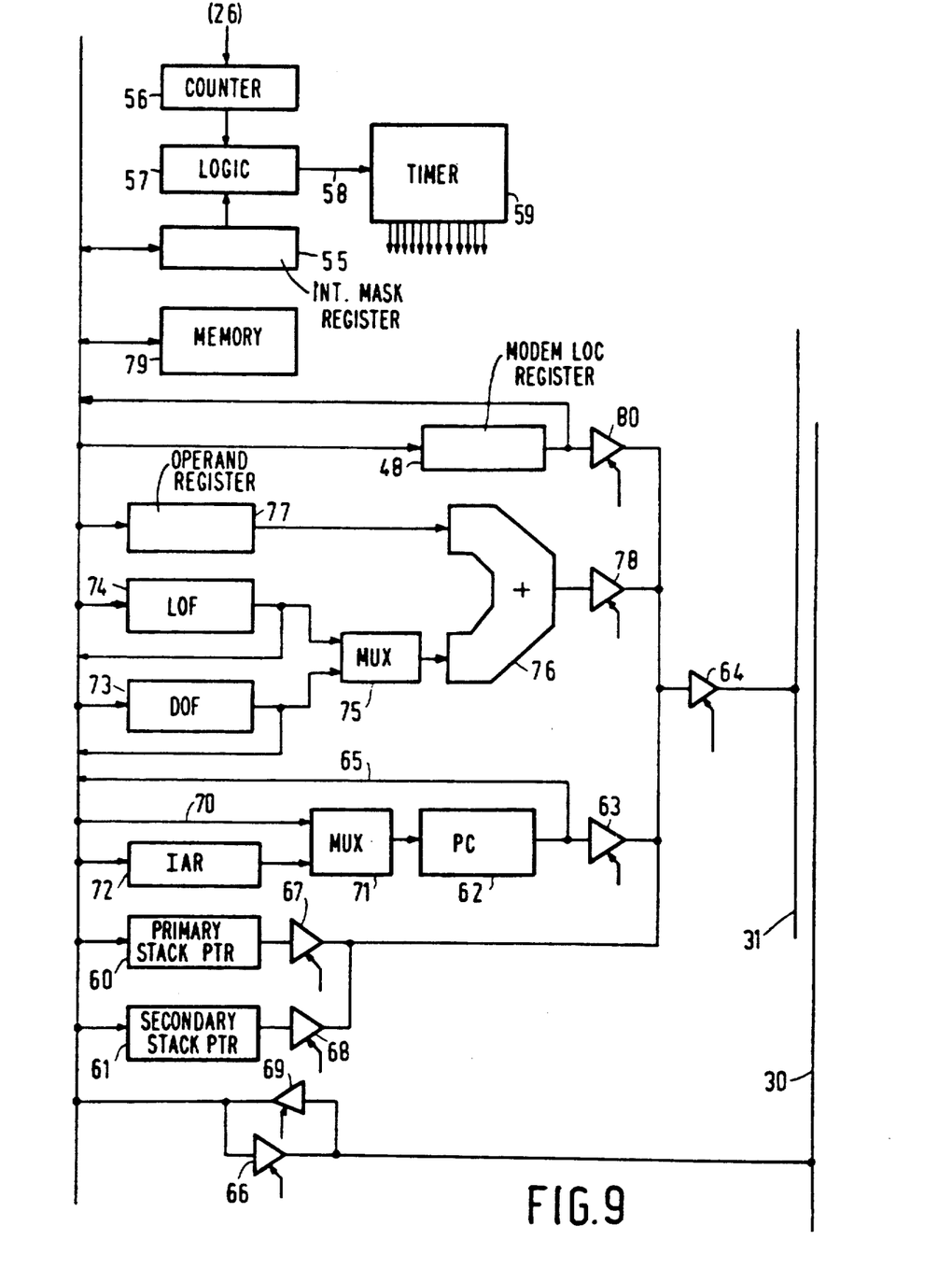
FIG. 9 is a general diagram of the communication control unit.

FIG. 9 is a general view of the embodiment of the communication control unit. Because this unit is actually a microprocessor whose construction and operation are assumed to be known in as far as the normal known processing operations are concerned, this unit will be described only in as far as is important for the explanation of the interruption process in accordance with the invention.

The communication control unit comprises an interrupt mask register 55 in which the operand (x) of the instruction SCND(x) can be stored, register and counting means 56, and logic means 57. The register and counting means 56 comprise the communication status registers (CST0) and (CST1), the communication operation register (COP) and the watchdog timer for guarding or defining the various waiting periods prescribed by the protocol (for example, for guarding the LLC response time and the token take-over time), the logic means comprising said six logic circuits which react to the signals from the register and counting means 56 which are decisive for the occurrence of the various described interrupt events occurring in the modem control unit. These events are checked on the basis of the relevant bits of the interrupt mask register (IMS) 55, an interrupt signal being applied to the timer 59 iva the lead 58 in the case of correspondence; this timer controls the processes taking place in the communication control unit.

When the interrupt signal has been issued, the secondary program must be interrupted, be it that the current program step is first completed; the primary program is abandoned by the instruction SCND(x). In both cases the current program is interrupted and it should be memorized where and in which circumstances the relevant program must be continued at a later stage. To this end, in addition to a first part for the primary program and a second part for the secondary program, in the communication memory there is reserved a third part which comprises a primary stack in which the location where and the circumstances in which the primary program is interrupted are memorized and a secondary stack in which the location where and the circumstances in which the secondary program is interrupted are memorized. The primary and the secondary stack are addressed by a primary stack pointer 60 and a secondary stack pointer 61, respectively. The program steps of a current program are indicated by a program counter 62; when a program is interrupted, the access for the program counter 62 to the memory address bus 31 is blocked, via the address control 63, 64, by blocking the address bus control 63 by means of a signal supplied by the timer 59. The contents of a program counter are then applied to the memory data bus 30, via the lead 65 and the address control 66, wherefrom they are transferred to the relevant stack, that is to say to a location which is indicated by the relevant stack pointer via the address bus control 67, 64 or 68, 64. The relevant stack pointer subsequently indicates the successive locations in the relevant stack in which the contents of various registers to be specified hereinafter should be saved. It is assumed that the location where and the circumstances in which the primary program is interrupted are thus saved, so that the secondary program can be continued. The primary stack pointer 60 is then blocked (by blocking the address bus control 67) and the secondary stack pointer 61 is released (by releasing the address bus control 68). The stack pointer 61 occupies the position in which it indicated the address of the last of the previously saved data in the secondary stack. By decrementing the stack pointer 61, the previously saved data and ultimately the position of the program counter at which the secondary program was interrupted are successively addressed, be it in the reversed order, via the address bus control 68 and via the address bus control 69, and stored in the respective registers (via the line 70 and via the multiplexer 71) and the program counter 62, respectively. Subsequently, the secondary stack pointer 61 is blocked and the program counter 62 is granted access to the memory address bus 31 in order to continue the secondary program as from the position in which it was interrupted. As soon as a subsequent interrupt event occurs and the interrupt signal is issued via the line 58, the program counter 62 is denied access to the memory access bus 31 again, and the secondary stack pointer 61 is released, so that it can indicate the successive addresses where the position of the program counter 62 and the contents of the various registers can be saved. Subsequently the secondary stack pointer 61 is blocked and the primary stack pointer 60 is released in order to fetch, in the reverse order, the contents of the various registers and the position of the program counter at which the primary program was previously interrupted from the primary stack so that the primary program can be continued.

This interruption procedure is quite distinct from the customary interruption procedure where an interrupt sub-routine in the own program is executed. This situation occurs in the present case when "external" interrupt events registered in the bits a-f of the interrupt mask register (IMS) 55 occur, where the position of the program counter and the contents of various registers are saved in the communication memory (in the secondary stack) when the interrupt signal for the interruption of the secondary program is issued and where the starting address of the interrupt sub-routine, present in the interrupt address register (IAR) 72, is stored in the program counter via the multiplexer 71; this sub-routine forms part of the secondary program and can be interrupted as such by interrupt events occurring in the modem control unit and necessitating the continuation of the primary program.

When the primary or secondary program is interrupted, the contents of various registers must be saved; this concerns registers involved in the execution of instructions. These registers include the data offset register (DOF) 73 and the label offset register (LOF) 74; these registers perform a function in obtaining an effective operand by adding the contents, via a multiplexer 75, in the counter 76 to the contents of an operand register 77; an effective operand of this kind serves to indicate (via an address bus control 78) specific memory locations, for example for the storage of data in FIFO registers in the communication memory and for executing jump instructions in the program. The registers whose contents must be saved when the relevant program is interrupted also include the program status register (PST) in which results of the execution of various instructions are stored, and the condition register (CR) in which the state of the conditions (for example, a, b and c in FIG. 8) giving rise to different actions in the finite state machine are indicated.

The primary program is abandoned after termination of a given program block; the secondary program can be interrupted at arbitrary instants, which means that the customary accumulation register (ACC) may just have been loaded when the interruption occurs. The contents of the accumulation register should also be saved when the secondary program is interrupted. When the primary program is abandoned, this is not necessary; if desired, the contents of this register can be stored elsewhere before the instruction SCND(x) is issued. The registers (PST, CR and ACC) mentioned in this respect and the further registers and counters which are not relevant for the present invention are accommodated in the unit 79.

Finally, FIG. 9 shows the modem location register 48 which is also shown in FIG. 6 and which actually does not belong to the communication control unit, the address but control which is denoted by the reference numeral 50 in FIG. 6 now being composed of two of such circuits 80 and 64. The address control circuits 63, 64, 66, 67, 68, 69, 78 and 80 together form a communication memory bus control unit, as separately represented by the reference numeral 28 in FIG. 5. The address bus control circuits are controlled by the timer 59 which allocates time slots to each of these circuits for access to the communication memory.

What is claimed is:

1. An interface device for interfacing a network station to a physical network medium, comprising:
   a demodulator for converting network signals into an input bit stream;
   a modulator for converting an output bit stream into further network signals;
   protocol means connected to said modulator/demodulator;
   a communication memory communicating with said protocol means over a communication memory bus, said communication memory comprising a first part for storing communication software as a primary program, and a second part for storing process software at least partly as a secondary program for a process to be executed in the station connected to the interface device;
   the protocol means comprising:
   modem control means for writing the bit stream received into and reading the bit stream to be transmitted from the communication memory;
   communication control means connected to the modem control means for controlling the execution of the primary and the secondary programs; and
   communication memory bus control means for assigning time slots for access to the communication memory to the modem control means and the communication control means upon receiving a request from the modem control means and the communications control means respectively;
   the modem control means further comprising means for interrupting the execution of the secondary program in the communication control means when a communication instruction is to be executed for the station, after which the communication control means executes the primary program but continues the execution of the secondary program during waiting periods in the execution of the primary program, and
   further memory means for memorizing the location where and the circumstances in which the primary and the secondary program have been interrupted.

2. An interface device as claimed in claim 1, in which the communication control means comprises an interrupt mask register in which an operand (x) of an instruction SCND(x) forming part of the primary program is stored, which operand (x) indicates the events in the modem control means which give rise to the interruption of the execution of the secondary program and a change over to the execution of the primary program.

3. An interface device as claimed in claim 2, in which the communication control means comprises:
   first register means for registering that the beginning of an incoming message has been signalled and subsequently that the destination address code in the message arriving corresponds to the address code of the station, and
   logic means comprising a first logic circuit connected to the first register means for, in response to the incoming message bit interrupting the secondary program in the case of correspondence to a bit indicating a relevant interrupt event in the interrupt mask register.

4. An interface device as claimed in claim 2 or 3, in which said communication control means comprises second register means for registering in a first bit that after the beginning, also the end of a message arriving has been detected and in a second bit that the end of a transmitted message has been detected, and also comprises logic means comprising a second logic circuit connected to the second register means for, in response to one of the first and second bits, indicating data in said second register means, interrupting the secondary program in the case of correspondence to a bit indicating a relevant interrupt event in the interrupt mask register.

5. An interface device as claimed in any one of claims 2 or 3, in which the communication control means comprises third register means and timer means connected to the third register means for registering that the time within which an anticipated event must have taken place, has been exceeded, and also comprises logic means which include a third logic circuit for interrupting the secondary program, in response to a bit in said third register means corresponding to the bit in the interrupt mask register indicating a relevant interrupt event.

6. An interface device as claimed in any one of the claims 2 or 3, intended for a token passing bus connection network, in which the communication control means comprises fourth register means for registering that an incoming message represents an invitation to a relevant station to participate in the logic ring of the token passing bus connection network, that the relevant station wishes to be included in the logic ring, and that the address code of this station is situated between range boundaries given in said invitation, and also comprises logic means which include a fourth logic circuit for interrupting the secondary program in reaction to bits in the fourth register means corresponding to the bit in the interrupt mask register indicating the relevant interrupt event.

7. An interface device as claimed in claim 6, intended for a token passing bus connection network, in which the communication control means comprises fifth register means for registering that the beginning of an incoming message has been detected and subsequently that this message includes an indication that the predecessor of the relevant station in the logic ring of the token passing bus connection network has been expelled from the logic ring, comparison means for comparing the contents of a data field of this message with an address code, registered in the relevant station, of the preceding station in the logic ring, and logic means which include a fifth logic circuit for interrupting the secondary program, in response to bits in said fifth register means and to the comparison means, when a bit in the interrupt mask register indicates a relevant interrupt event.

8. An interface device as claimed in claim 7, intended for a token passing bus connection network, in which the communication control means comprises sixth register means for registering that, after the passing of the token to a next station in the logic ring of the token passing bus connection network, the beginning of a message has been detected, and also logic means which include a sixth logic circuit for interrupting the secondary program in response to a bit in the said sixth register means corresponding to the bit indicating a relevant event in the interrupt mask register.

9. An interface device as claimed in claim 8, in which the communication control means comprises a primary and a secondary stack pointer, the position of the customary program counter included in the communication control means being stored in the primary stack in the further memory means, at the locations indicated by the primary stack pointer, when the primary program is interrupted, after which the position of the program counter and the contents of indicated registers, which may differ from said registers and belong to the communication control means, as previously saved in the secondary stack in the further memory means, are read from the locations in the further memory means which are indicated by the secondary stack pointer in order to be stored in the program counter and in the appropriate registers, respectively, the position of the program counter and the contents of the relevant registers being stored in the appropriate secondary stack when the secondary program is interrupted, at the locations indicated by the secondary stack pointer, after which the position of the program counter and the contents of the relevant registers as previously saved, in the primary stack, are read from the locations in this memory which are indicated by the primary stack point in order to be stored in the program counter and the appropriate registers, respectively.

10. A protocol control unit for an interface device for a connection network between individual stations and a physical medium used for the message traffic between the individual stations, comprising:
    modem means for converting signals supplied via the physical medium into a bit stream and for converting a bit stream into signals to be transmitted via the physical medium, the protocol control unit being connected to the modem means and communicating, via a communicating memory bus, with a communication memory, the protocol control unit comprising a modem control unit for writing the reading the bit stream received and to be transmitted into and from of the communication memory, respectively;
    a communication control unit connected to the modem control unit for controlling the execution of a process to be carried out as a primary program stored in a first part of the communication memory as communication software and of a process control software at least partly included as a secondary program in a second part of the communication memory in the station connected to the interface; and
    a communication memory bus control unit for assigning time slots for access to the communication memory to the modem control unit and the communication control unit, the modem control unit further comprising means for interrupting the execution of the secondary program in the communication control unit when a communication instruction is to be executed after which the communication control unit executes the primary program but continues the execution of the secondary program during waiting periods in the execution of the primary program; and,
    further memory means for memorizing the location where the circumstances in which the primary and the secondary program have been interrupted.

11. A protocol control unit as claimed in claim 10 is implemented by an integrated circuit.

12. A device for interfacing a network station to a physical network and comprising:
    modem means for bidirectional conversion between network signals and a corresponding internal bit stream;
    protocol control means connected to said modem means;
    communication memory means;
    a communication memory bus connected to said communication memory means and to said network station, said communication memory means having a first part for storing a primary communication program and a second part for storing a secondary process control program executable by said network station, said protocol control means comprising:
    a modem control means connected to the communication memory means for bidirectional access control of said communication memory means with respect to said bit stream and having first request generating means;
    a communication control means for ensuring execution of the first and second programs respectively and having second request generating means;
    bus control means responsive to said first and second requests generating means for allowing access by said modem control means and said communication control means, respectively, to said communication memory means, in respective time slots, while granting priority to said first request generating means, and conceding to said second request generating means for continuing the execution of the secondary program during waiting periods in executing said primary program;
    a second memory, for upon interruption of said secondary program by said granting priority, storing an actual location and circumstance data of said secondary program.

* * * * *